Feb. 25, 1936.  W. E. JOHNSTON  2,032,283
PRESSURE OPERATED REGULATOR FOR BURNERS
Filed June 18, 1932   5 Sheets-Sheet 1

INVENTOR
WAYBURN E. JOHNSTON
BY
ATTORNEY

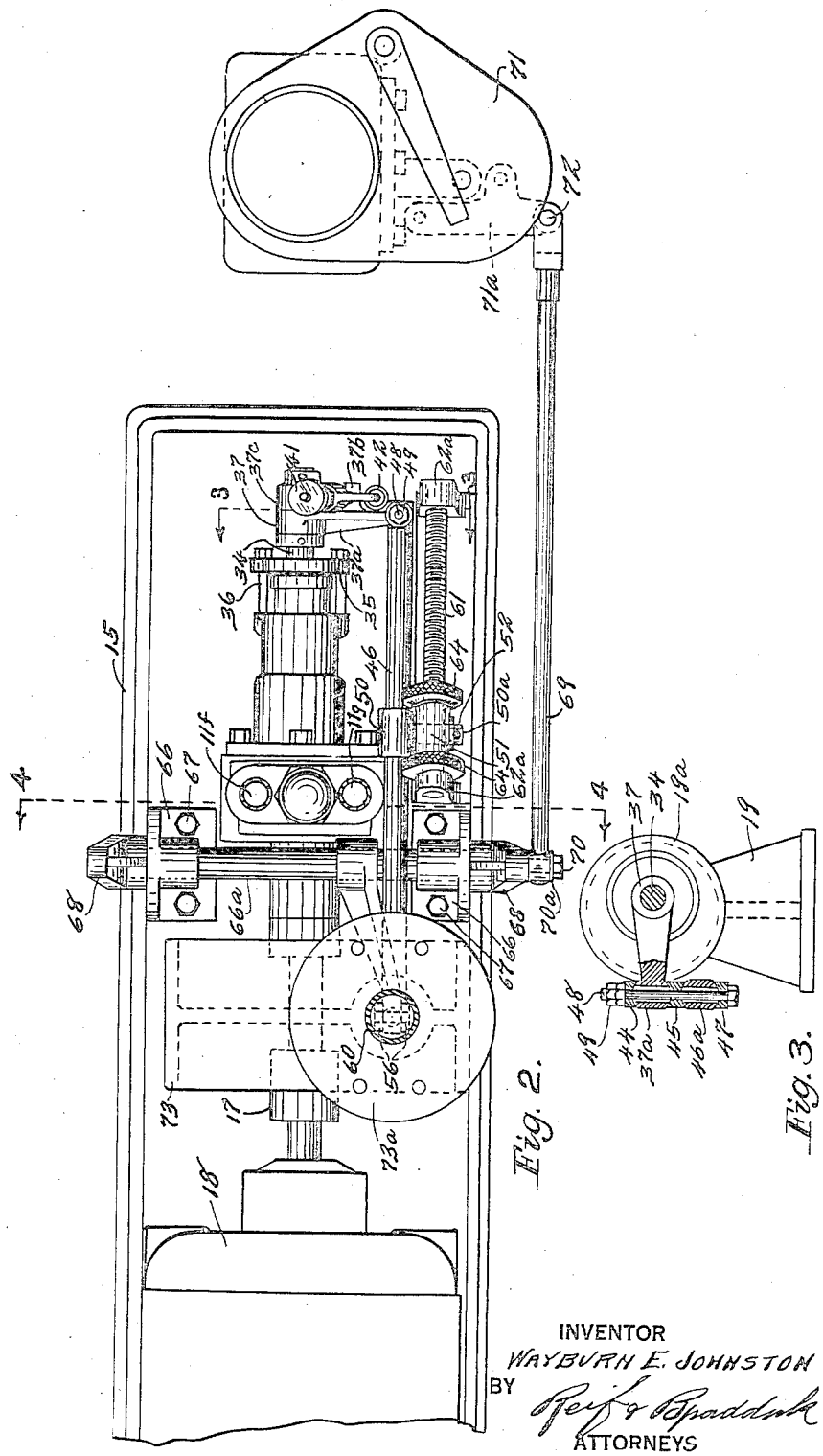

Feb. 25, 1936.  W. E. JOHNSTON  2,032,283
PRESSURE OPERATED REGULATOR FOR BURNERS
Filed June 18, 1932  5 Sheets-Sheet 3
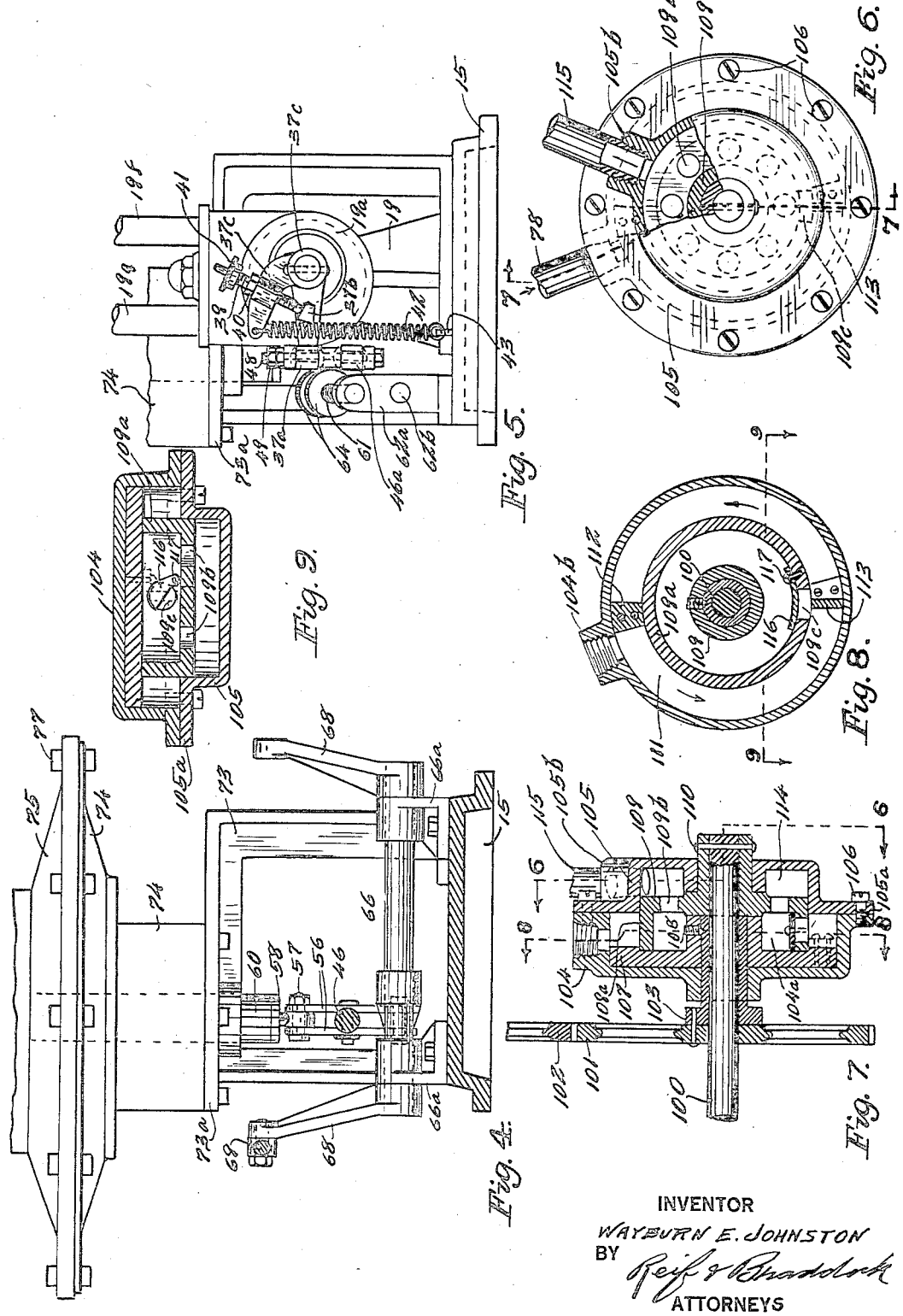
INVENTOR
WAYBURN E. JOHNSTON
BY
Reif & Braddock
ATTORNEYS

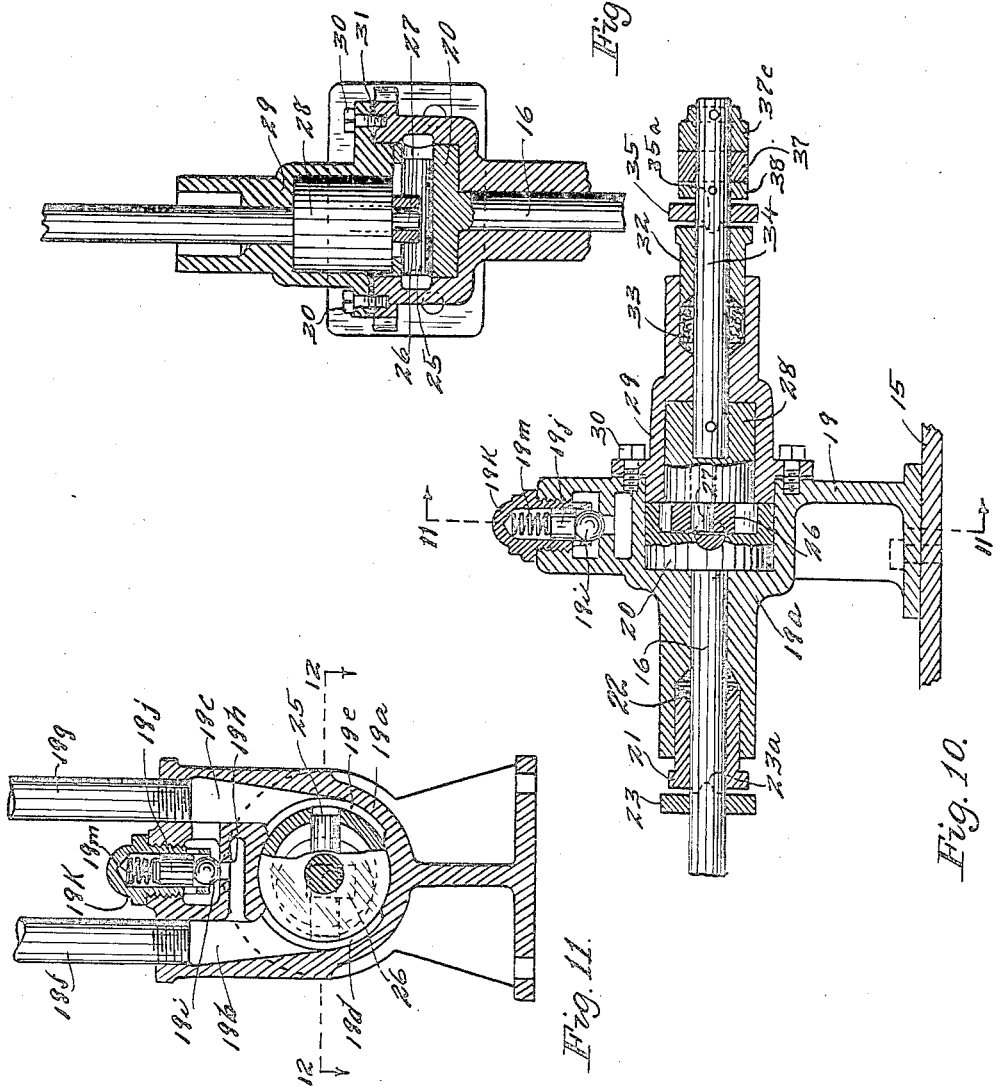

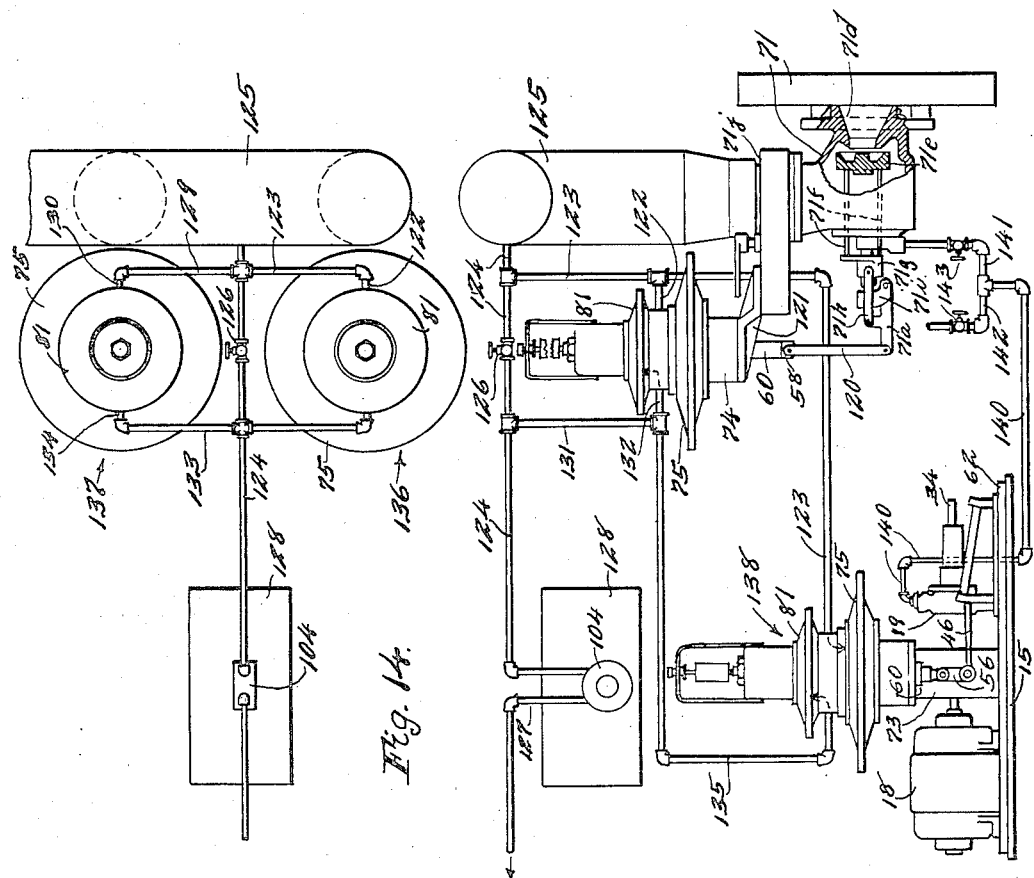

Patented Feb. 25, 1936

2,032,283

UNITED STATES PATENT OFFICE 2,032,283

PRESSURE OPERATED REGULATOR FOR BURNERS

Wayburn E. Johnston, Minneapolis, Minn.

Application June 18, 1932, Serial No. 618,077

26 Claims. (Cl. 236—82)

This invention relates to a furnace control device or a control device or regulator for a burner which heats the furnace or other member. Heat treating furnaces used for annealing castings and other objects, forge furnaces, and furnaces of other types are now commonly used, and it is quite important not only to regulate the temperature closely, but at the same time to maintain the right kind of atmosphere in the furnace. It is, of course, also desirable and almost necessary to have a control member or regulator which is automatic. The burners used for heating the furnaces usually use liquid fuel or oil, and air is supplied under pressure for combustion. The control devices and regulators of the prior art have largely used valves for regulating the oil supply. The oil generally used for fuel in said furnaces is heavy and this oil contains numerous lumps or clots of semi-solid matter, as well as some sand or other sediment. When regulation is attempted by closing or partially closing a valve or otherwise diminishing the passage through which the oil passes, the lumps or clots in the oil tend to collect at the restricted point and this action increases until the free flow of oil is impeded. The valves also tend to stick, and it is difficult to move the valve the required distance to give the desired regulation. If such valves are opened to relieve the impeding collection of matter therein, an excess of oil is allowed to pass to the burner, giving a reducing atmosphere in the furnace.

It is also desirable in a regulator or control member for a burner to secure one which is perfectly responsive to the changes in the burner. This, of course, is an ideal condition. In most regulators this condition is not attained, as there is a lag between the burner and the regulator due to friction and the mechanical structure and movements of the regulator. Such cases not only cause a lag, but often results in movements of the regulator which are not in harmony or synchronism with the changes in the burner.

It is an object of the present invention, therefore, to provide an automatic regulator for a burner to which both the oil and air supplied to the burner are regulated, and both of which are regulated by a device perfectly responsive to the change in temperature of the burner.

It is another object of this invention to provide an automatic regulator for a burner or furnace in which both the oil and air supplied to the burner are regulated and the oil is regulated while maintaining the passage through which the oil passes at its regular size, together with means for causing the regulator to be substantially perfectly responsive to the change in the burner.

It is a further object of the invention to provide an automatic regulating device for a burner or furnace comprising an air supply for said furnace and and oil supply means for said furnace, and means for varying said air and oil supply means in accordance with air pressure, which pressure is directly responsive to the temperature in the burner.

It is another object of the invention to provide an automatic control device for a burner comprising means associated with the temperature determining means of the burner or furnace which functions to create a certain air pressure, a means responsive to said air pressure constructed and arranged to move a member which in turn is connected to means for regulating the air supplied to the burner, and means for regulating the oil supplied to the burner.

It is still another object of the invention to provide an automatic regulator for a burner or furnace comprising means associated with the pyrometer or potentiometer of the furnace for determining a fluid pressure directly proportional to the temperature, means comprising a balanced valve responsive to said pressure and having a moving element connected to the means for varying the oil supply and the means for varying the air supply.

It is more specifically an object of the invention to provide an automatic regulator for a burner or furnace comprising means associated with the temperature recording instrument constructed and arranged to build up a fluid pressure in direct ratio to the temperature, means responsive to said pressure including a diaphragm operated means movable in response to said pressure, a member movable by the last mentioned means connected to an air regulating valve and to an oil supply pump, whereby the supply of oil and air may be regulated.

It is also an object of the invention to provide an automatic regulator for the burners of a furnace which will similarly and accurately govern a plurality of burners in accordance with the temperature of the furnace, which regulator can be used to govern the supply of air and oil separately or to govern the supply of air and oil at the same time.

These and other objects and advantages of the invention will be fully set forth in the following description made in connection with the accompanying drawings, in which like reference characters refer to similar parts throughout the several views, and in which:—

Fig. 2 is a view in horizontal section taken on line 2—2 of Fig. 1;

Fig. 3 is a vertical section taken on line 3—3 of Fig. 2;

Fig. 4 is a vertical section taken on line 4—4 of Fig. 2;

Fig. 5 is an end view as seen from the right of Fig. 2;

Fig. 6 is a view partly in end elevation and partly in vertical section of a pyrometer attachment;

Fig. 7 is a vertical section taken on line 7—7 of Fig. 6;

Fig. 8 is a vertical section taken on line 8—8 of Fig. 7;

Fig. 9 is a horizontal section taken on line 9—9 of Fig. 8, as indicated by the arrows;

Fig. 10 is a longitudinal vertical section through a pump used;

Fig. 11 is a vertical section on line 11—11 of Fig. 10, as indicated by the arrows;

Fig. 12 is a vertical section taken on line 12—12 of Fig. 11, as indicated by the arrows;

Fig. 13 is a view in side elevation of the arrangement showing the regulator applied to a plurality of burners;

Fig. 14 is a plan view of some of the parts shown in Fig. 13; and,

Fig. 15 is a section showing the top portion of Fig. 1.

Figure 1:
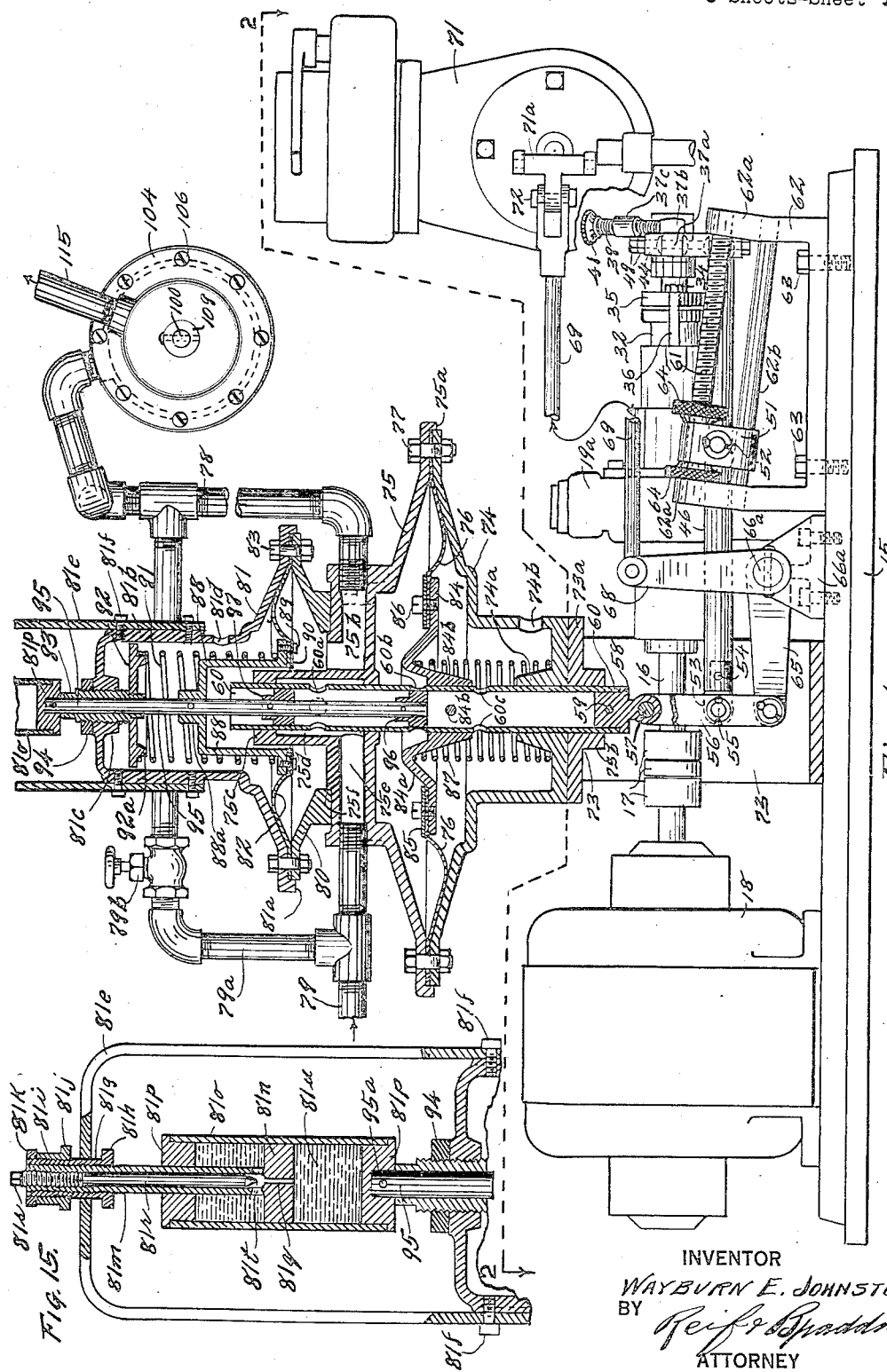
Fig. 1 is a view partly in side elevation and partly in central vertical section through the diaphragm regulator.

Referring to the drawings, a device is shown comprising a motor driven pump and regulator therefor mounted on a base 15. Said pump has a driving shaft 16 connected by suitable couplings 17 to a motor 18 which will be driven from any suitable source of current and which is positively driven as long as the burner to be regulated is in operation. While various kinds of pumps might be used, in the embodiment of the invention illustrated, a pump is shown comprising a casing 19 having a base flange secured to the base member 15, which pump is arranged to be constantly driven but to deliver different quantities of oil or liquid. Said pump constitutes a housing 19a having a cylindrical chamber in which is fitted a head 20 secured to and adapted to be turned by the shaft 16 extending through a hub projecting from the housing 19a, which hub is bored at its end to receive a packing gland 21 adapted to engage suitable packing 22 and press the same about the shaft 16. Said gland 21 has an end flange with grooves therein adapted to be engaged by ribs 23a on a holding and adjusting member 23 through which shaft 16 passes, and which is secured to the hub of the housing 19a by headed screws (not shown), passing therethrough and threaded into said hub. Head 20 has extending therethrough a transverse cylindrical bore in which is disposed a plunger 25. Plunger 25 has a rectangular groove extending transversely thereof, in which is fitted a block 26. Said block 26 has a hole formed therein, in which is disposed and rotatable a pin 27 which projects eccentrically from a cylindrical block 28 fitting in the cylindrical bore of a head 29 bolted to housing 19a by the cap bolts 30, which head has a cylindrical portion at its front end adapted to fit in the bore in housing 19a and engage the head 29. A gasket 31 is disposed between the head 29 and housing 19a. The head 29 is bored at its outer end to receive a packing gland 32 adapted to press packing 33 about a shaft 34 which is secured to block 28 and projects outwardly through head 29. Gland 32 has an outer flange with grooves at the sides thereof into which extend ribs 35a on a holding and adjustable member 35 through which shaft 34 passes and which is secured to gland 32 by the headed screws 36. Shaft 34 extends outwardly from member 35 and has journaled on its outer end the hub of a lever 37. A collar 38 is pinned on shaft 34 at the inner side of lever 37. The housing 19a has at its upper end passages 19b and 19c communicating respectively with semi-annular grooves 19d and 19e formed in said housing at either side of head 20, and conduits 19f and 19g are secured in housing 19a and communicate respectively with the passages 19b and 19c. Said housing comprises a diaphragm 19h, the space at the under side of which communicates with passage 19b, said diaphragm having an opening therethrough, the upper side of which is formed as a valve seat adapted to be engaged by a check valve 19i illustrated as a ball. Member 19i is engaged by a plunger 19j slidable in a cap or shell 19k screwed into the top of housing 19a between conduits 19f and 19g. A spring 19m is disposed in the top of said cap and bears against plunger 19j at its lower end and against the top of said shell at its upper end, thus tending to force ball valve 19i against its seat. The space above diaphragm 19h communicates with the passage 19c as shown in Fig. 11. The lever 37 has a laterally projecting arm 37a which has projecting therefrom intermediate its ends a lug 37b. Another lever arm 37c is secured to shaft 34 outwardly of lever 37, which lever arm 37c has an arm extending upwardly and laterally toward the outer end of arm 37a and has a hub intermediate its ends in which is threaded a screw 39 having a jamb nut 40 thereon engaging the top of said lug. Said screw has a knurled adjusting wheel 41 at its upper end secured thereto, and the lower end of said screw is rounded to engage lug 37b. The lever arm 37c is apertured at its outer end and has secured therein one end of a tensile coiled spring 42, the other end of which is secured to a screw 43 threaded into the base member 15. The outer end of arm 37a is semi-spherical in shape and has on its top a cap 44 having a semi-spherical recess fitting thereover. A washer or collar 45 is disposed below the semi-spherical end of arm 37a, fitting about its semi-spherical portion, and said collar has its lower side formed with a semi-spherical recess adapted to fit over the semi-spherical end 46a of the lever 46. A lower cap 47 has a semi-spherical recess fitting about the lower side of the semi-spherical end of lever 46 and arm 37a and the end of lever 46a are bored to receive the headed bolt 48 which is of smaller diameter than the bore in said members, which bolt also passes through and fits in the caps 44 and 47 as well as collar 45 and carries the nuts 49 at its upper end above cap 44. Lever 46 passes through a lug or collar 50 having projecting laterally therefrom a stem 50a extending through a block 51 and held in said block by the cotter key 52 passing therethrough. Lever 46 at its other end receives a head 53 secured therein by the pin 54 which is secured by a pin 55 to a pair of links 56. The links 56 extend substantially vertically in parallel relation and are secured at their upper ends by the pin 57 to a head 58 secured by the pin 59 to a vertically movable hollow shaft or tube 60 to be later described. The block 51 is slidable on a screw 61 carried in the end arms 62a of a bracket 62 secured to the base 15 by the screws 63. Block 51 is adjustable on the screw 61 by nuts 64 of cylindrical form having knurled peripheries which are threaded on the screw 61 and engage the ends of block 51 respectively. Said block slides on a rod 62b forming part of bracket 62 and extending parallel to screw 61. The lower ends of links 56 are connected to the end of a lever arm 65 having a hub secured to a shaft 66a extending transversely of the base 15 and journaled in bearing brackets 66 bolted to each side of said base by the bolts 67. Shaft 66a has secured to each end thereof an arm 68 extending upwardly at the sides of base member 15. These arms 68 are adapted to be connected to links, one of which is shown as 69, connected to the end of one of the arms 68 by the screw 70. A washer 70a is shown as being disposed beneath the head of screw 70 against the outer end of the hub of link 69. The link 69 extends to adjacent the burner 71 and has its other end bifurcated and embracing and connected to an air regulating arm 71a of said burner by the bolt or pin 72.

Bracket 73 is secured to base 15 intermediate its ends and has a plate-like top portion 73a with a downwardly extending central hub 73b and a casing 74 is secured to the top portion 73a. Said top portion and hub 73b are bored to have the plunger tube 60 pass freely therethrough. Casing 74 has an upper disk-like circular flange and a top casing 75 is supported thereon, having a flange 75a extending about the outer edge of casing 74. A flexible diaphragm 76 is clamped between the edges of casings 74 and 75, said casings and diaphragm being secured together by the circumferentially spaced headed and nutted bolts 77. Casing 75 has an upper portion with offset vertical sides which are tapped to receive conduits 78 and 79. An opening 75b extends inward from conduit 78 and opens out at the top of casing 75. Casing 75 has a central cylindrical portion 75c extending vertically therethrough, said cylindrical portion being hollow to have therein the chamber 75d. An opening 75e leads inward from the conduit 79 into the chamber 75d. The central lower portion of member 75 and the upper end of cylindrical portion 75c are bored to receive slidably the plunger tube 60. Casing 75 also has a short vertically extending cylindrical portion 75f surrounding the lower part of portion 75c and a casing 80 has a cylindrical base fitting tightly about the portion 75f and fitting tightly on the top of casing 75. Casing 80 has at its upper end a disk-like circular flange about which extends a rib or flange 81a of another casing 81, said rib 81a depending from a circular flange on casing 81 overlying the said flange on casing 80, a flexible diaphragm 82 being disposed between said circular flanges on members 80 and 81, said diaphragm being clamped between said flanges which are connected by the headed and nutted bolts 83. The casing 81 has a cylindrical upper portion 81b, which has an opening 81d therein. The diaphragm 76 has a central opening through which extends the conical central portion 84a of a member 84, having a disk-like flange over which the inner edge of the diaphragm 76 lies. Portion 84a of member 84 is pinned by pin 84b to tube 60.

A washer plate 85 overlies said inner edge of diaphragm 76 and said washer and diaphragm are secured to the flange of member 84 by the screws 86. A compression coil spring 87 engages the under side of member 84 and surrounds a downwardly extending conical hub portion 84b thereof which is bored to have the plunger tube 60 extend therethrough. The lower end of spring 87 rests on the bottom of casing 74 and surrounds an upwardly extending conical hub 74a thereof. The inner end of diaphragm 82 extends over the bottom of a flange projecting from the lower end of a hollow cylindrical member 88 and is secured thereto by the screws 89 which also pass through a washer 90 overlying said diaphragm. A compression coil spring 91 surrounds member 88 having its lower end resting upon the flange at its lower end and the upper of said spring engages a plate 92 having a depending flange 92a thereon surrounded by the upper end of said spring. Plate 92 has a central aperture which receives a cylindrical projection depending from a member 93 threaded into the central hub 81c at the top of portion 81b of member 81. Plate 92 rests against a shoulder formed on the member 93 and a jamb nut 94 is threaded on the upper end of member 93 and engages the top of hub 81c. The member 93 is bored to receive a rod 95 which moves therethrough with a free sliding fit, which rod extends downwardly coaxial with the plunger tube 60 and has secured to its lower end a piston 96 which moves with a free fit in the plunger tube 60. Rod 95 also has pinned thereto some distance above piston 96 a second piston 97 also slidable in plunger tube 60 with a free fit. Said rod 95 also has pinned thereto the hub 88a at the top of member 88, through which rod 95 passes. The upper end of the portion 75c of casing 75 is bored to have the plunger tube 60 slidable therein and said plunger tube is also slidable through the lower end of casing 75. The plunger tube 60 has a plurality of holes 60a therein some distance below its upper end and also has a plurality of holes 60b therein some distance below holes 60a and has a plurality of holes 60c therethrough some distance below the holes 60b. Casing 74 has one or more openings 74b through the side of its lower cylindrical portion.

The member 81 has a yoke 81e with parallel arms extending along the sides of member 81 and secured thereto by the screws 81f. Said yoke is bored at its top to have slidable therein a sleeve 81g having a head or flange 81h at its lower end and exteriorly threaded at its upper end to receive a member 81i having a projecting flange 81j at its lower end. A nut 81k is threaded on the top of member 81g and engages member 81i to act as a jamb nut. Member 81g is interiorly threaded to receive the upper threaded end of a hollow plunger rod 81m which is connected at its lower end to a plunger or piston 81n. Piston 81n is movable within a dash pot 81o having secured in the ends thereof flanged closure members 81p. The lower closure member or head 81p is rigidly connected to the rod 95 by the pin 95a. The plunger 81n has an aperture 81q extending therethrough formed at its upper end to constitute a valve seat, and said seat is adapted to be engaged by the valve forming end of a rod 81r extending through rod 81m, said rod 81r being threaded into the upper end of member 81m and having a head 81s of angular form, the same being shown as square. Rod 81m has a plurality of openings 81t extending therethrough just above the valve seat at the top of aperture 81q.

The conduit 79 extends to the air line or a source of air under pressure which is usually on hand to supply air to the burner 71. A pipe 79a extends from pipe 79 at one side of member 75 and is connected to pipe 78 which leads from the other side of member 75. A regulating valve 79b is disposed in conduit or pipe 79a. Such burners are usually equipped with a pyrometer to indicate the temperature thereof, and in Figs. 1, 6, 7 and 8 a device is shown which will be attached to the pyrometer. While different forms of pyrometers may be used, the particular type illustrated is the well known Leeds & Northrup pyrometer. Such pyrometers have a revoluble dial or other member to adjust them for different temperatures. In Figs. 1, 6, 7 and 8, a shaft 100 of such a pyrometer is shown, to which is secured a gear 101 adapted to mesh with another gear 102 equipped with means for turning the same to adjust the position of gear 101. Gear 101 has secured thereto a member 103 journaled on shaft 100 and extending through a substantially cylindrical casing 104. Casing 104 has a chamber 104a therein and has a flange at one side to which is bolted by the bolts 106 a complemental flange 105a of another casing 105. Casing 104 has a hub surrounding member 103. The member 107 is secured to member 103 by a set screw 108, and another member 109 is secured to the outer end of shaft 100, by the rivet or bolt 110, said member 109 having a cylindrical flange 109a, the inner edge of which is recessed slightly into the wall of member 107 fitting against the end of casing 104. The cylindrical flange 109a thus forms an annular chamber 111 between its outer wall and the wall of casing 104. Casing 104 has an outwardly extending hub 104b tapped to receive the conduit 78 which extends from casing 75. Member 107 has projecting across the annular chamber 111 a pair of blocks or partitions 112 and 113. Member 109 has a plurality of holes 109b formed through its vertical portion within the flange 109a, which holes communicate with a chamber 114 formed in the outer portion of casing 105 and between the outer wall of casing 105 and the vertical portion of member 109. Member 105 has an outwardly extending hub 105b into which is threaded a conduit 115 which will extend to the atmosphere. Member 109 also has an opening 109c extending radially therethrough and this opening has overlying it at the inner side of flange 109a, a plate 116 secured and swingable about a screw 117, the shape of said plate being shown in Fig. 9.

In operation motor 18 will be driven and through the coupling 17 will drive the shaft 16 of the pump 19. It will be seen from Figs. 10, 11 and 12 that pin 27 is eccentric to the axis of head 20 and shaft 16. When the head 20 is driven, block 26 slides in the groove in plunger 25 and said plunger is reciprocated in head 20. It will be seen that the eccentricity of pin 27 can be varied by turning shaft 34. Pin 27 can be brought to a position coaxial with shaft 16 and head 20 and when this occurs, plunger 25 will not be reciprocated. When said pin is at one side of the center, plunger 25 is reciprocated and is nearer one side of head 20 than the other. When pin 27 is at the other side of the center, plunger 25 is nearer the other side of head 20. Pump 19 can therefore be set or adjusted so that oil will be taken in conduit 19f and discharged through conduit 19g in varying amounts or it can be set so that no oil will be delivered at all. It can also be set so that oil will be taken in at conduit 19g and discharged through conduit 19f.

With the burner operating, the oil is taken in through conduit 19g and discharged through conduit 19f. The pumping action is caused by the oil passing from passage 19c into groove 19e and then into the end of the bore in which plunger 25 is disposed. The end of plunger 25 will be some distance from the end of the bore and when head 20 revolves one hundred and eighty degrees, the end of said plunger will be moved outward toward the end of the bore, thus forcing the oil outward into groove 19d and out through passage 19b and conduit 19f. The movement of plunger 25 as stated can be varied by adjustment of pin 27, by turning the shaft 34. The amount of oil delivered can be varied therefore, by turning the shaft 34. It will be apparent that when lever 37 is turned, that shaft 34 will be turned and the discharge from pump 19 varied. It will also be noted that this variation in the amount of oil delivered is secured without diminishing the oil passages. When lever 37 has its arm 37a moved downwardly or counter-clockwise, the amount of oil pumped to the burner is diminished. When arm 37a is moved upwardly, the amount of oil pumped to the burner is increased. It will be seen that spring 42 will cause arm 37c to move with arm 37a when arm 37a moves downwardly, and when arm 37a moves upwardly, lug 37b will engage the end of screw 39 and move arm 37c upwardly.

The amount that the oil is regulated will depend upon the position of the block 51. As shown in Figs. 1 and 2, the block is now in its farthest position to the left, so that the end of lever 46 to which arm 37a is connected has its greatest movement. If block 51 be moved to the right by adjustment of nuts 64, then there will be a smaller movement of arm 37a for the same movement of tube 60. It is usually desired to regulate a burner between certain quantities of consumption. If with the setting illustrated it be assumed that the burner was regulated between five and twenty-five gallons per hour, then the movement of block 51 to the right would mean that it would be regulated between five and a lesser number of gallons than twenty-five. Rod 62b is parallel to lever 46 with tube 60 in its highest position and block 51 in the position shown. By having the screw 61 and the rod 62b thus inclined downwardly and parallel, the lower limit of consumption will remain constant, unless screw 39 is adjusted. By turning said screw upwardly away from lug 37b, the lower limit can be set lower and by screwing said screw downwardly to separate arms 37c and 37a, the lower limit can be raised.

Assuming that the burner is operating and being brought up to the desired temperature, shaft 100 will revolve as the temperature increases. This action is usually secured through a thermostat or thermocouple in the furnace. As stated, conduit 79 is connected to the blast line and the air pressure used in the blast line is present in chamber 75d and in the chamber in tube 60 between the pistons 97 and 96. The pistons 97 and 96 are fitted to have very little friction, if any, on the walls of the tube 60, but they are fitted to keep the pressure of the blast from passing out of said chambers. Some air, however, will leak past the pistons and this air passing the upper piston will pass into the upper end of member 88 downwardly below diaphragm 82 into passage 75b and conduit 78. This air therefore passes into chamber 111 of casing 104 at the left of the members 112 and 113, as seen in Fig. 8. Some air will also be delivered into the chamber 111 through pipe 79a. This pipe forms a bypass and valve 79b will be adjusted to give the desired amount of pressure and air to be delivered to chamber 111. When the temperature of the burner is low, the opening 109c in portion 109a of member 109 is near member 112 which is fixed in relation to casing 104. As the temperature rises, shaft 100 is moved in a counterclockwise direction as indicated by the arrow in Fig. 8, and portion 109a is similarly moved so that opening 109c approaches member 113. As long as opening 109c is to the left of member 113 as seen in Fig. 8, the air passing into chamber 111 through conduit 78 can pass through opening 109c into member 109 through the openings 109b and out through the vent or exhaust pipe 115. As opening 109c begins to pass member 113, the outlet for the air diminishes and when opening 109c has passed member 113, the outlet for the air is closed and pressure will begin to build up in chamber 111 at the left of and between members 112 and 113. This pressure will, of course, extend back through conduit 78 and the passage 75b and into the chamber below diaphragm 82. Diaphragm 82 will thus be raised a certain distance corresponding to said pressure, thus raising member 88 and compressing spring 91. When member 88 is moved upwardly it carries with it piston rod 95 to which it is pinned and said rod in turn moves pistons 97 and 96 upwardly in plunger tube 60. As stated, conduit 79 is connected to the air supply for the blast and the full pressure of the blast is thus normally present in chamber 75d. When the mechanism shown in Fig. 1 is in the illustrated position, it will be seen that the air under pressure in chamber 75d has no outlet. The pistons 96 and 97 prevent its outlet either downwardly or upwardly, the lower piston closing the ports 60b. When piston 96 is moved upwardly as described, the ports 60b are partly uncovered and communication is afforded from the top of diaphragm 76 through ports 60b, the interior of tube 60 and ports 60c and 74b to the atmosphere. Spring 87 can now act and member 84 and tube 60 to which it is pinned will be pushed upwardly with diaphragm 76 until the ports 60b again register with the piston 96 and communication is again shut off with the atmosphere when further movement upwardly of member 84 will be prevented. The member 84 thus reaches balanced position when it has moved upwardly exactly the same amount as member 88 has moved, which is the distance that the pistons 96 and 97 have moved. It was found in the development of the device that if the rod 95 was moved freely by the diaphragms, the device was too sensitive and a greater motion than necessary would be obtained. It was then proposed to use a dash pot to regulate the movement of the rod 95 and thus of the pistons 96 and 97. After much experimenting with the dash pot it was found that this would retard the action too greatly. The idea was then conceived of using a dash pot with a lost motion device so that the rod 95 could move freely for a certain distance but would be retarded after having moved this distance. It was for this purpose that yoke 81e and member 81g were provided. It will be seen that when member 88 is raised by diaphragm 82 and rod 95 is thus raised, that dash pot 81o, is moved upwardly. The movement of the dash pot is, of course, resisted by plunger 81n, since relative movement of the dash pot and plunger can only take place by the liquid or oil 81u in the dash pot passing the plunger 81n. This resistance to movement of the dash pot by plunger 81n causes both the dash pot and plunger, together with rod 81m and member 81g to be moved upwardly until the upper surface of flange 81h engages the yoke 81e. The upward movement of rod 95 and the dash pot is then checked and any further movement of rod 95 must take place slowly to enable the oil to pass plunger 81n. The latter portion of the movement caused by diaphragm 82 is quite slow. It will be seen that member 81g can be adjusted on rod 81m and member 81i can be adjusted on member 81g. The free movement of rod 95 can therefore be adjusted to be greater or smaller. When tube 60 is moved up by member 84, it carries with it the block 58 and the links 56. Lever 46 is thus swung by the links 56 about its fulcrum 50a and through the connection 48 and associated parts arm 37a is moved downwardly. This turns shaft 34 and the supply of oil as described is diminished. At the same time links 56 swing lever arm 65 and 68 and through the link 69 the air to the burner is cut down by means of a lever 71a. The fuel and air supply to the burner will thus be cut down and the temperature will not continue to rise in the burner or furnace. Should the temperature drop so that member 109a moves back and opening 109c and a portion thereof passes member 113, the pressure will be diminished in the chamber at the left as shown in Fig. 8 between members 112 and 113 and pressure will thus be diminished in the chamber below diaphragm 82. When this occurs, the spring 91 will force member 88 downwardly, thus moving down pistons 96 and 97. The downward movement of member 88 will be free until the lower surface of flange 81j engages the top of yoke 81e. The movement will then be retarded by the dash pot 81o so that there will not be an excessive movement of member 88 and thus of rod 95. Downward movement of the piston 96 will uncover the upper portions of ports 60b and the air under pressure in chamber 75d which is also within the tube 60 between pistons 96 and 97 will pass out through the ports 60b into the chamber above diaphragm 76. Diaphragm 76 will thus have pressure above it and said diaphragm and member 84 will be moved downwardly until the ports 60b are again closed. When the ports 60b are again closed by piston 96, member 84 again reaches balanced position, and it will thus be moved downward exactly the same distance that member 88 moved downward. Downward movement of member 84 causes downward movement of tube 60 and as described, this movement will regulate the supply of oil and air through lever 46 and link 69 so that said supply will be increased. The temperature will again rise and opening 109c will be moved past member 113. The burner will thus be brought to and maintained substantially at the desired temperature. The regulator is of the type which maintains substantially one temperature instead of the type which works on the high-low principle to maintain the burner between certain limits. The opening 109c is, of course, gradually closed as it moves past member 113. With the described structure, therefore, the burner will gradually come up to the desired temperature and will be maintained substantially at this temperature. It will be seen that the structure comprised in members 58 to 97 constitutes a balanced valve and the movement of the member 60 caused thereby is directly responsive to the pressure exerted below diaphragm 82. In fact, said diaphragm member 88 and thus pistons 96 and 97 move a certain definite amount for each pressure. The pressure is in effect measured by the spring 91. Member 84 as stated moves exactly the same distance upwardly or downwardly as the pistons 96 and 97, and this will be true regardless of the friction of the parts or the load. The air is exhausted above diaphragm 76 or is placed in communication with the atmosphere when it is moved upwardly by spring 87, while when it is moved downwardly it is positively moved by the pressure of the air from the source of blast. The diaphragm will be sure to be forced down as it will have the full pressure of the blast thereon and diaphragm 76 is of large area. The regulation of the oil and air is therefore made by the movement of member 60 and this is directly responsive to the pressure in chamber 111 which is in accordance with the temperature of the burner. As stated, the pistons 96 and 97 depend in the tubes 60 and have practically no friction therewith. Diaphragm 82 and member 88 therefore always take a definite position for a certain pressure. This action is substantially the same as a spring scale using a compression spring. The movement and position of members 82 and 88 is thus independent of any friction. It will also be seen, as has been above described, that member 84 will be moved exactly the same distance that member 88 has been moved, regardless of the friction of any parts and regardless of load conditions. If there is more friction or if some of the parts are inclined to stick, the movement of member 84 may be somewhat retarded, but it must positively move the same distance as member 88.

Two levers 68 are shown and a plurality of burners can thus be simultaneously regulated by the levers 68. These burners will both be regulated exactly the same amount. The pump can supply oil to two burners. The conduit 19g passing to the burner will have branches leading therefrom to the burner with regulating valves in each branch. These valves would be provided to apportion the oil between burners of different capacity.

The regulator can also be used to regulate a plurality of burners where the oil and air are separately regulated. In Figs. 13 and 14 a burner 71 is shown. The burner has a discharge passage 71d through which air passes, which air is regulated by the movable members 71e. This member is carried on a plurality of rods 71f secured to the member 71g which is moved toward and from the burner by the links 71h connected to the lever 71a pivoted to a bracket 71i. Lever 71a is connected by the links 120 to block 58 already described, connected to tube 60. The casing 74 is shown as carried on a bracket 121 secured to a portion 71j of the burner. Casing 75 as already described is connected to member 74 and casings 80 and 81 are connected above casing 75. Members 74 and the parts thereabove are exactly the same as shown in Fig. 1. The pipe 79 is replaced by a pipe 122 connected by a suitable T to a pipe 123 in turn connected to a pipe 124 which communicates with a conduit 125 through which air is supplied to the burner 71 and which is the blast line of the furnace. Pipe 124 has a valve 126 therein which will act as a throttling valve to merely reduce the amount and pressure of the air passing beyond the same and pipe 124 beyond valve 126 is connected to casing 104 as already described in connection with the pipe 78. An exhaust pipe 127 leads from casing 104 and takes the place of pipe 115 shown in Figs. 1, 6 and 7. It will be understood that the member indicated as 104 in Figs. 13 and 14 embodies the parts shown in Figs. 6, 7 and 8, with, as already stated, pipe 124 taking the place of pipe 78 and pipe 127 taking the place of vent pipe 115. Member 104 is shown as associated with the pyrometer or potentiometer 128. Another pipe 129 corresponding to pipe 123 communicates with the pipe 130 which is connected to another casing 75 so that there are two diaphragm controls, each of which includes the parts 74 to 97 shown in Fig. 1. It will be understood that each diaphragm control includes the members 60 and 58 and that there are two sets of links 120 as well as a burner 71 for each of the diaphragm controls. A pipe 131 is connected to pipe 124 and has a pipe 132 leading therefrom which communicates with member 75 and specifically to chamber 75b thereof as shown in Fig. 1. Pipe 122 as well as pipe 130 communicates with passage 75e in member 75. Another pipe 133 leads from pipe 124 and communicates with the pipe 134 connected to member 75 of the other diaphragm control shown in Fig. 14 and pipe 134 also communicates with passage 75b of member 75.

A pipe 135 extends from pipe 131 and this pipe communicates with chamber 75b of a member 75 of another diaphragm control adapted to control the oil to the two burners 71. Pipe 123 also extends to member 75 of the oil control diaphragm and this is connected to chamber 75e of said member 75. The diaphragm control shown at the bottom of Fig. 14 comprising the parts 74 to 97 will be designated 136, while the diaphragm control shown at the top of Fig. 14 will be designated 137 and the diaphragm control for controlling the oil to the two burners will be designated 138. The diaphragm control 138 has its tube 60 connected to lever 46 as shown in Fig. 1 and pump 19, motor 18, and base member 15 are shown as shown in Fig. 1, and the parts will be connected as shown in Fig. 1 except that links 56 will not be connected to arm 65, which arms will be omitted as will also parts 66, 67, 68 and 69. Otherwise the pump control is the same as shown in Fig. 1. The outlet of the pump has a pipe 140 connected thereto which is connected by a suitable T to branch pipes 141 and 142, each of which has therein a valve 143. Pipes 141 and 142 are connected respectively to the burners 71 and supply oil thereto.

With the arrangement shown in Figs. 13 and 14, the pressure carried in the blast will be constantly present in chamber 75d of member 75. Reduced pressure is supplied to pipe 124 beyond valve 126 and this pressure passes into member 104 and is exhausted through opening 109c and pipe 127 until opening 109c as already described, passes member 113. This reduced pressure then builds up in chamber 111 and is transmitted into the diaphragm controls 136 and 137 operating diaphragm 82 as already described. The members 60 therefore of the diaphragm controls 136 and 137 will control the air to the burners 71. The same reduced pressure is applied to chamber 75b of the diaphragm control 138 and the blast pressure is applied to chamber 75e thereof by pipe 123. This pressure also passes the member 104 and diaphragm control member 138 responds to the movement of member 104a just as do the diaphragm members 136 and 137. The diaphragms 82 and members 88 in each of the diaphragm controls will therefore be moved to certain definite positions by the pressure developed in member 104. The springs 91 will, of course, be very nicely adjusted so that they are the same in each control. The pressure developed in member 104 will therefore produce exactly the same results in movement of the member 88 in each of the diaphragm controls and the diaphragm 76 and member 84 will be moved in each diaphragm control exactly the same distance which will be the same distance that member 88 is moved or a distance in fixed ratio to the distance that member 88 is moved. The oil and air for each burner will therefore be accurately controlled directly responsive to the temperature in the furnace and this control will be had regardless of the friction of the parts or the resistance due to the work done in moving the parts. It will readily be seen that any number of burners can therefore be controlled and that the movement of member 69 will be exactly the same for each burner. It will also be seen that if desired, a pump can be used for each burner instead of having one pump for both burners. In such case the connection from lever 46 would extend to the arm 37a of each pump instead of just to one pump. It will also be noted that the pump furnishing oil to one burner may be adjusted so that a certain movement of arm 37a would control the pump between different limits than the same movement would control the pump for another burner. One burner in the furnace might be located close to the door and it would be desired to supply more oil to this burner. It might be stated that the valves 143 in the pipe lines 141 and 142 leading to the burners are merely to control the relative amounts of oil which pass to the burners.

From the above description it is seen that applicant has provided a simple and efficient control or regulator for a furnace and the burners thereof. As above stated, a practically frictionless primary control is used which is directly responsive to the pressure developed by the temperature of the burner. This primary control member controls a power control and this is constructed and arranged to move in fixed ratio to the movement of the primary control regardless of frictional or work resistance. An accurate and positive control of the burner is thus secured. As above described the regulator or control is applicable to a plurality of burners and every burner will be accurately controlled in direct response to the pressure developed at the pyrometer device. The temperature of the burner will, of course, be determined by adjustment of member 113 which is carried on member 107, in turn carried on member 103 turned by the gear 101. Plate 116 can be moved entirely off of opening 109c, or it can be moved over said opening as shown in Fig. 19. The shape of opening 109c can also be varied. The greater the area of opening 109c affected by a certain movement of portion 109a, the more sensitive will be the control. If the opening 109c were rectangular with a long dimension extending parallel to the shaft 100, a slight movement of member 109a would mean quite a large closing movement or effect of opening 109c. It is not desirable, however, to have the regulator too sensitive as this means that it will move too far for very small temperature changes and the temperature graph would move quite a distance at each side of the desired temperature line. By having a lesser area of opening 109c affected by a small movement of member 109a, the temperature line is kept almost in a straight line. The burner comes up to the desired temperature and the pressure created by the position of opening 109c is responded to by the diaphragm control and the burner is held approximately at one temperature.

It will be understood that when the furnace is cold or at low temperature, the spring 91 forces diaphragm 82 or member 88 to substantially their lowest position. When the furnace reaches the desired temperature and the pressure is created in chamber 111, this pressure as described acts on and raises diaphragm 82 and the diaphragm control balances at the proper point to hold the furnace at one temperature. The parts are illustrated in Fig. 10 in an intermediate position.

The device has been amply demonstrated in actual practice and found to be very successful and efficient. It is obvious that it is readily applicable to any burner using oil or other liquid fuel and/or air for combustion.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. Means for regulating a furnace heated by a plurality of burners, having in combination, a plurality of burners, means for creating a pressure in accordance with the temperature of said furnace, a plurality of members each movable a certain distance by said pressure, a plurality of other members, one for each of said first members respectively movable a distance in fixed ratio to the movement of said first mentioned members, and means for regulating fluid supplied to said burners actuated by some of said other members, and means for regulating the air to said burners actuated by the remainder of said other members.

2. A regulator having in combination, a member movable with substantially no friction, a diaphragm surrounding and attached to said member adapted to be moved by air pressure in one direction, a spring against which said member is moved, a second diaphragm coaxial with said member adapted to be moved in one direction by air pressure, a spring for moving said second member in the opposite direction, a valve part carried by said first mentioned member, a cooperating part carried by said second diaphragm, said parts being adapted to be moved out of registry by movement of said first mentioned member and into registry by movement of said second diaphragm whereby said second diaphragm is moved in fixed ratio to the movement of said first mentioned member, means creating a pressure in accordance with the temperature produced by a burner for moving said first mentioned diaphragm and member, and means for regulating the fuel supplied to said burner and/or the air supplied to said burner actuated by said second member.

3. A regulator having in combination, a freely movable member, a diaphragm for moving said member and coaxial therewith adapted to be actuated by fluid pressure, a spring against which said member is moved and for moving said member in the opposite direction, a second member, a diaphragm for moving said second member in one direction by fluid pressure, a spring for moving said second member in the opposite direction and opposite to the direction said first mentioned diaphragm is moved by said first mentioned spring, means causing said second member to be moved a distance in fixed ratio to the movement of said first mentioned member, means for creating a pressure in accordance with the temperature produced by a burner for actuating said first mentioned diaphragm, and means for increasing or decreasing the air and/or fuel supplied to said burner actuated by the movement of said second member.

4. A regulator for an operative device having in combination, a relay diaphragm adapted to be moved by fluid pressure, means for balancing said diaphragm against said fluid pressure and for moving it in the opposite direction, a power diaphragm adapted to be moved in one direction by fluid pressure, a spring for moving said power diaphragm in the opposite direction and in a direction opposite to the movement of said first mentioned means, means causing said power diaphragm to move a distance in fixed ratio to the movement of said relay diaphragm regardless of friction or load resistance, means for creating a pressure in accordance with the temperature produced by a burner for moving said relay diaphragm, and means actuated by said power diaphragm for regulating said device.

5. Means for regulating a furnace heated by a plurality of burners, having in combination, means for supplying fuel to said burners, means for creating a pressure in accordance with the temperature of said furnace, a second means responsive to said created pressure and movable to a certain position thereby, a member movable in fixed ratio to the movement of said second means, means for moving said member, means actuated by said member for varying the supply of fuel to said burners, an additional means responsive to said created pressure and movable to a certain position thereby for each of said burners, members movable in fixed ratio to the movement of said additional means respectively, means for moving said last mentioned members, and means for increasing or decreasing the supply of air to said burners operated by said last mentioned members.

6. A regulator for a furnace heated by burners having in combination, means movable in accordance with the temperature of said furnace, a member movable to vary the supply of fuel to said burner, a lever connecting said means and member for moving the latter, a fulcrum member for said lever movable lengthwise thereof and a rigid guide means for said fulcrum member.

7. A regulator for a furnace heated by burners having in combination, means movable in accordance with the temperature of said furnace, a member movable to vary the supply of fuel to said burner, a lever connecting said means and member for moving the latter, a movable fulcrum for said lever, a guide member for said fulcrum extending parallel to a position of said lever with one end of said lever at its limit of movement.

8. A regulator for a burner having in combination, a member movable in accordance with the temperature produced by said burner, a member having a chamber therein, means for producing fluid pressure in said chamber, means connected to said first mentioned member for closing said chamber to cause pressure to increase therein, a second chamber, a diaphragm in said chamber movable in one direction by fluid pressure in said chamber, means connecting said chamber to said first mentioned chamber, a third chamber, a diaphragm in said third chamber movable by fluid pressure therein, a valve mechanism connecting said second and third chambers having a movable member connected to said first mentioned diaphragm whereby fluid may pass from said second chamber to said third chamber, a member connected to said second mentioned diaphragm and movable thereby, and means for varying the oil and/or air supplied to said burner movable by said last mentioned member.

9. The structure set forth in claim 8, each of said diaphragms being moved in one direction by fluid pressure and being movable in the other direction by a compression spring.

10. A regulator for a burner having in combination, means for creating an air pressure at a certain temperature created by said burner, a member movable a certain distance in one direction in response to said air pressure, a constantly acting means for moving said member in the opposite direction when said pressure is diminished, a second member movable in one direction by air pressure, a second constantly acting means for moving said second member in the opposite direction when said pressure is diminished and acting in the direction opposite to said first mentioned constantly acting means, cooperating means connected respectively to said first and second members for causing said second member to be moved in fixed ratio to the movement of said first mentioned member and means connected to said second member for regulating the supply of air and/or fuel to said burner.

11. A regulator for a burner using fluid fuel and to which air is supplied having in combination, a chamber associated with said burner, means for creating a pressure in said chamber at a certain temperature produced by said burner, a flexible diaphragm in said chamber, a balanced valve including a pair of spaced pistons movable as a unit, means connecting said diaphragm to said valve whereby said valve is unbalanced by said pressure, means for again balancing said valve including a flexible diaphragm and a member having ports moving into alinement with said pistons respectively, a member moved in the balancing of said valve and air and fuel regulating means actuated by said member.

12. A regulator for a burner using fluid fuel and to which air is supplied having in combination, a chamber associated with said burner, means for creating a pressure in said chamber at a certain temperature produced by said burner, a diaphragm in said chamber operated in one direction by said pressure, a spring for moving said diaphragm in the opposite direction, a second chamber, a second diaphragm in said second chamber constructed and arranged to be moved in one direction by pressure, automatically acting means for moving said second diaphragm in the opposite direction and cooperating means connected to said diaphragms respectively whereby said second diaphragm is moved in fixed ratio to said first mentioned diaphragm regardless of friction and load conditions and air and fuel regulating means positively connected to and movable by said second diaphragm.

13. A regulating device having in combination, a member adapted to be moved to regulate an operating unit, a chamber, a diaphragm in said chamber adapted to be moved in one direction by fluid pressure in said chamber, a spring for moving said diaphragm in the opposite direction, a member rigidly connected to said diaphragm having a piston thereon and movable therewith, a cylinder in which said piston moves having a port adapted to cooperate with said piston, a second chamber, a second diaphragm in said second chamber, said cylinder being secured to said second diaphragm, a spring for moving said second diaphragm in the opposite direction and means connecting said first mentioned member and said cylinder.

14. A regulating device having in combination, a member adapted to be moved to regulate an operating unit, a chamber, a diaphragm in said chamber movable in one direction by fluid pressure in said chamber, a spring adapted to move said diaphragm in the opposite direction, a member connected to said diaphragm having spaced pistons thereon and movable in both directions therewith, a cylinder in which said pistons move having ports adapted to cooperate respectively with said pistons, a second chamber, a second diaphragm in said second chamber adapted to be moved in one direction by fluid pressure in said second chamber and connected to said cylinder, a spring for moving said second diaphragm in the opposite direction and means connecting said first mentioned member and cylinder.

15. A device of the class described having in combination, a member to be actuated for regulating an operative device, a diaphragm movable in one direction to certain positions responsive to certain conditions of said operative device, means for moving said diaphragm in the opposite direction, a second member movable independently of said diaphragm and positively connected to said first mentioned member, a second diaphragm movable in one direction by fluid pressure, means for moving said second diaphragm in the opposite direction and cooperating means comprising a pair of spaced pistons movable with one diaphragm and a cylinder with spaced ports movable with the other diaphragm for causing said second member and said second diaphragm to move in fixed ratio to the movement of said first mentioned diaphragm.

16. A regulator for a furnace having in combination, a member moved as the temperature of said furnace increases, a chamber, means for delivering air to said chamber, said chamber having an outlet closed by the movement of said member at a desired temperature causing a rise of pressure in said chamber, a second chamber communicating with said chamber to which air is supplied from said first mentioned chamber and to which said pressure is communicated, a diaphragm in said second chamber movable in one direction by said pressure, a spring opposing said movement and acting to move said diaphragm in the opposite direction, a third chamber, a second diaphragm in said third chamber movable in one direction by pressure, a spring for moving said second diaphragm in the opposite direction, a member secured to said first mentioned diaphragm movable to relieve the pressure in said second chamber at one side of said second diaphragm whereby said second diaphragm is moved by said second mentioned spring and means for stopping the movement of said second diaphragm when the same has moved the same distance as said first diaphragm was moved.

17. A regulator for a furnace having in combination, a chamber, a diaphragm in said chamber movable in one direction by air pressure, means opposing said movement and acting to move said diaphragm in the opposite direction, said chamber being closed except for means for supplying air thereto and means for exhausting air therefrom, a second chamber, a second diaphragm in said second chamber movable in one direction by pressure, means opposing such movement and acting to move said second diaphragm in the opposite direction and in a direction opposite to that in which said first mentioned diaphragm is moved by said first mentioned means, means for obstructing said exhaust means when the furnace reaches a certain temperature to create a pressure in said first mentioned chamber and move said first mentioned diaphragm, means connected to said first mentioned diaphragm and movable thereby permitting a release of pressure from one side of said second diaphragm whereby said second diaphragm is moved by said second mentioned means, means for stopping the movement of said second diaphragm when it has moved the same distance as said first mentioned diaphragm and a regulating member connected to said second diaphragm.

18. A regulator for a furnace having in combination, a chamber, a diaphragm in said chamber movable in one direction by air pressure, means opposing said movement and acting to move said diaphragm in the opposite direction, said chamber being closed except for means for supplying air thereto and means for exhausting air therefrom, a second chamber, a second diaphragm in said chamber movable in one direction by pressure, means opposing such movement and acting to move said second diaphragm in the opposite direction and in a direction opposite to that in which said first mentioned diaphragm is moved by said first mentioned means, means for obstructing said exhaust means when the furnace reaches a certain temperature to create a pressure in said first mentioned chamber and move said first mentioned diaphragm, a member connected to said first mentioned diaphragm comprising a piston, a member connected to said second diaphragm comprising a cylinder having a port with which said piston cooperates, said piston uncovering said port in the movement of said first mentioned diaphragm and said second mentioned means moving said second diaphragm to move said port into registry with said piston whereby the movement of said second diaphragm is stopped and a regulating means connected to said second diaphragm.

19. A regulator for a furnace having in combination, a chamber, a diaphragm in said chamber movable in one direction by air pressure, means opposing said movement and acting to move said diaphragm in the opposite direction, said chamber being closed except for means for supplying air thereto and means for exhausting air therefrom, a second chamber, a second diaphragm in said chamber movable in one direction by pressure, means opposing such movement and acting to move said second diaphragm in the opposite direction and in a direction opposite to that in which said first mentioned diaphragm is moved by said first mentioned means, means for obstructing said exhaust means when the furnace reaches a certain temperature to create a pressure in said first mentioned chamber and move said first mentioned diaphragm, a member connected to said first mentioned diaphragm comprising a pair of spaced pistons, a cylinder connected to said second diaphragm having spaced ports with which said pistons respectively cooperate and a regulating member connected to said second diaphragm.

20. The structure set forth in claim 17 and means resisting the movement of said first mentioned diaphragm after a certain movement thereof.

21. A regulator for a burner having in combination, a member movable to regulate the supply of fuel and/or air to said burner, a balanced structure for moving said member comprising a chamber, a flexible diaphragm therein movable in one direction by air pressure, a spring resisting said movement and acting to move said diaphragm in the opposite direction, means for supplying air to said chamber at one side of said diaphragm, means for exhausting air from said chamber, a second chamber, a second diaphragm in said second chamber adapted to be moved in one direction by air pressure, a spring for moving said second diaphragm in the opposite direction, means for obstructing said exhaust means when the temperature of said burner reaches a certain point thus creating an air pressure in said first mentioned chamber to move said first mentioned diaphragm and cooperating means carried by said diaphragms whereby said last mentioned spring moves said second mentioned spring a distance equal to the movement of the first mentioned diaphragm.

22. Means for regulating a furnace heated by a plurality of burners having in combination, a plurality of burners, separate means for supplying fuel to said burners, means for creating a fluid pressure in accordance with the temperature of said furnace, a second means including a flexible diaphragm for each burner responsive to said created pressure and movable to a certain position thereby, a member for each of said second means movable relatively to but in fixed ratio to the same, means for moving said member in said fixed ratio and means actuated by each of said members for varying the supply of fuel to said burners respectively.

23. An apparatus for controlling the temperature of a furnace heated by a burner using fuel and air having in combination, a chamber, means for creating a pressure in said chamber in accordance with the temperature of said furnace, a diaphragm to which said pressure is transmitted moved by said pressure, resilient means opposing the movement of said diaphragm and acting to move it in a direction opposite to that by which it is moved by said pressure, a member operated in response to the movement of said diaphragm and movable relatively thereto but in a fixed ratio to the movement of said diaphragm, a rigid member connected to said member and means pushed and pulled upon by said rigid member and means connected to said last mentioned means for varying the amount of fuel and air delivered to said burner.

24. An apparatus for controlling the temperature of a furnace heated by a burner using fuel and air having in combination, a chamber, means for creating a pressure in said chamber in accordance with the temperature of said furnace, a diaphragm to which said pressure is transmitted moved by said pressure, resilient means opposing the movement of said diaphragm and acting to move it in a direction opposite to that by which it is moved by said pressure, a member operated in response to the movement of said diaphragm and movable relatively thereto but in a fixed ratio to the movement of said diaphragm, a rigid member connected to said member, means moved by said rigid member for varying the amount of fuel and air delivered to said burner, a dashpot for controlling the movements of said diaphragm and means bringing said dashpot into operation after a certain movement of said diaphragm.

25. A device of the class described having in combination, a member to be actuated for regulating an operative device, a fluid actuated diaphragm movable to certain positions responsive to and determined by certain conditions of said operative device, a third member movable independently of said diaphragm and positively connected to said first mentioned member to move the same in opposite directions, means for moving said third member relatively to but in fixed ratio to the movement of said second mentioned member, retarding means for retarding the movement of said diaphragm and means bringing said retarding means into operation after said diaphragm has moved a certain distance.

26. A regulator for a furnace having a burner using fuel and air having in combination, means movable in opposite directions for varying the fuel and/or air supplied to said burner, a rigid means connected to said means for pushing and pulling thereon to move the same in opposite directions, a chamber through which air is passed, means for obstructing said air in accordance with the temperature of said furnace so that a pressure is produced in said chamber, means in said chamber movable in one direction by said air, a spring opposing said movement and acting to move said means in the opposite direction and means responsive to the movement of said last mentioned means movable relatively thereto but in fixed ratio thereto connected to said rigid member.

WAYBURN E. JOHNSTON.